Nov. 7, 1967            G. R. HUISMAN            3,351,228

BOTTOM STRUCTURE FOR MOLDED PLASTIC CONTAINER

Filed July 22, 1965            2 Sheets-Sheet 1

INVENTOR
GEORGE R. HUISMAN

By Browne, Schuyler & Beveridge

ATTORNEYS

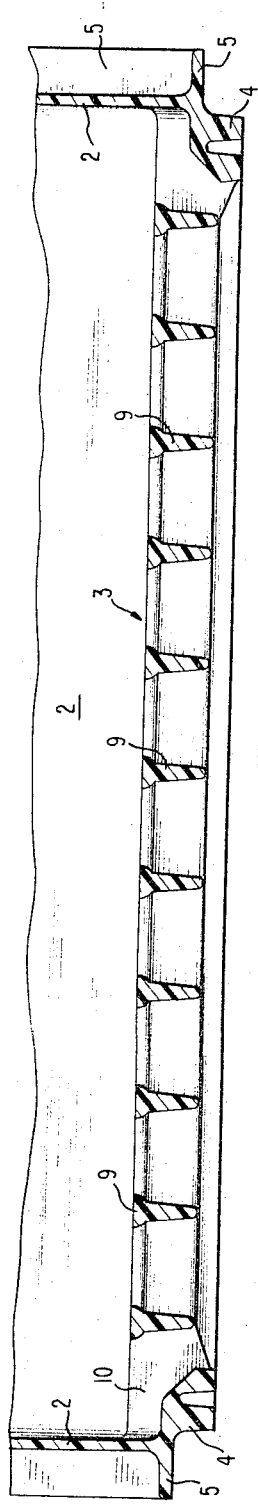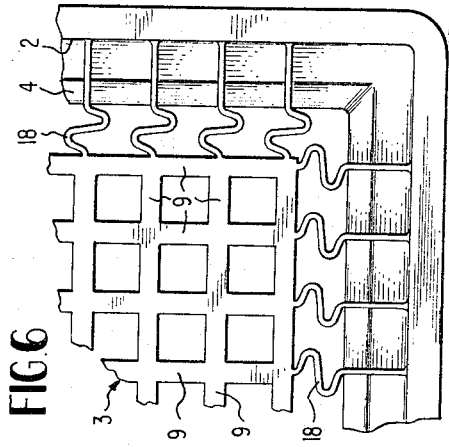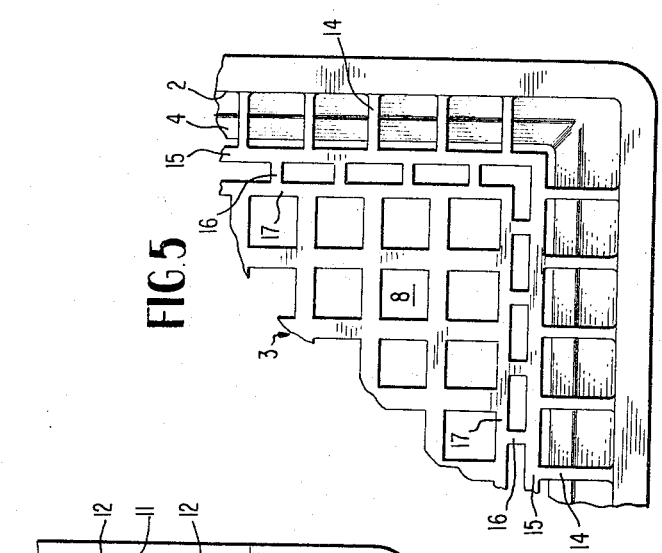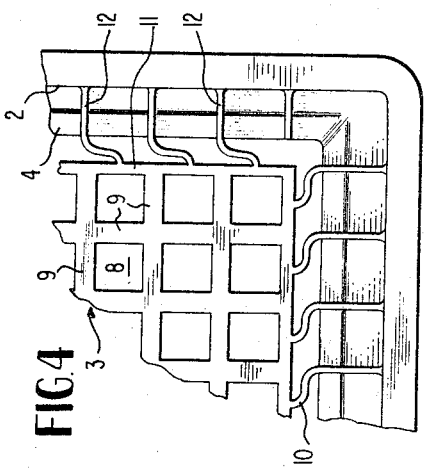

United States Patent Office 3,351,228
Patented Nov. 7, 1967

3,351,228
BOTTOM STRUCTURE FOR MOLDED
PLASTIC CONTAINER
George R. Huisman, Inglewood, Calif., assignor to Rehrig Pacific Company, Los Angeles, Calif., a corporation of California
Filed July 22, 1965, Ser. No. 474,062
3 Claims. (Cl. 220—66)

ABSTRACT OF THE DISCLOSURE

A molded plastic material handling container having an integrally formed expansion joint between the bottom panel and the side panels of the container to permit differential shrinkage or expansion between these parts to thereby reduce internal stress and buckling of the container.

---

This invention relates to material handling containers molded from synthetic resin materials, and more particularly to material handling container having side and bottom panels integrally molded from synthetic resin materials.

Although receptacles molded from synthetic resin materials, hereinafter referred to generally as plastics, have met widespread acceptance, considerable difficulty has been encountered in molding large containers having integrally formed side and bottom panels as a result of the differential shrinkage which is often encountered between the bottom panel and the surrounding side panels. This differential shrinkage has resulted in a tendency of the bottom panel to bow upwards in the center when the bottom panel shrinks less than the side panels, and has resulted in areas of high stress when the bottom panel shrinks more than the side panels, thereby tending to cause an early failure of the receptacle. This has been particularly true in receptacles employed to handle relatively heavy articles as, for example, molded plastic crates for use in handling a plurality of bottles of milk.

Molded plastic milk crates are normally formed with a relatively rigid or heavy-sectioned bottom panel which is integrally joined to the side panels at an area of increased section as, for example, at an integrally molded stacking ring. The side panels of such crates are normally in the form of relatively thin panels which may be provided with reinforcing ribs as needed to prevent buckling when the crates are stacked one upon another. This variation in the section of the various elements of the crate frequently results in differential shrinkage of the various segments of the crate after it has been removed from an injection mold.

It is an object of this invention to provide an improved molded plastic crate which will not be adversely affected by differential shrinkage.

Another object of this invention is to provide an improved molded plastic crate constructed to accommodate differential shrinkage between the various elements of the crate.

Another object of this invention is to provide an improved molded plastic crate suitable for use by the dairy industry and which includes an integrally molded bottom panel movable with respect to the side panels.

In the attainment of the foregoing and other objects an important feature of the invention resides in a molded plastic milk crate having a generally rectangular bottom panel and integrally joined side panels spaced outwardly from the peripheral edges of the bottom panel and extending upward therefrom. The bottom panel is preferably a molded plastic grating including a plurality of openings defined by elongated web-like members integrally joined at their respective ends. The web-like members are dimensioned to be relatively rigid in a direction normal to the bottom panel while being capable of limited resilient deflection intermediate their ends in the plane of the bottom panel. The web-like members extending along the peripheral edges of the bottom panel are joined intermediate their ends to the bottom edge portion of the side panels by integrally molded gusset elements. If desired, the gusset elements may be dimensioned for limited resilient deflection in the plane of the bottom panel, the resilient deflection of the web-like members and the gusset elements permitting limited resiliently resisted movement between the bottom panel and the side panels to accommodate any differential shrinkage of the various elements of the crate.

Other and further objects will become apparent from the following specification, taken with the drawings, in which:

FIG. 3 is a fragmentary sectional view taken on line 3—3 of FIG. 2; and,

FIGS. 4, 5 and 6 are fragmentary elevational views similar to FIG. 2 showing alternate embodiments of the invention.

Figure 2:
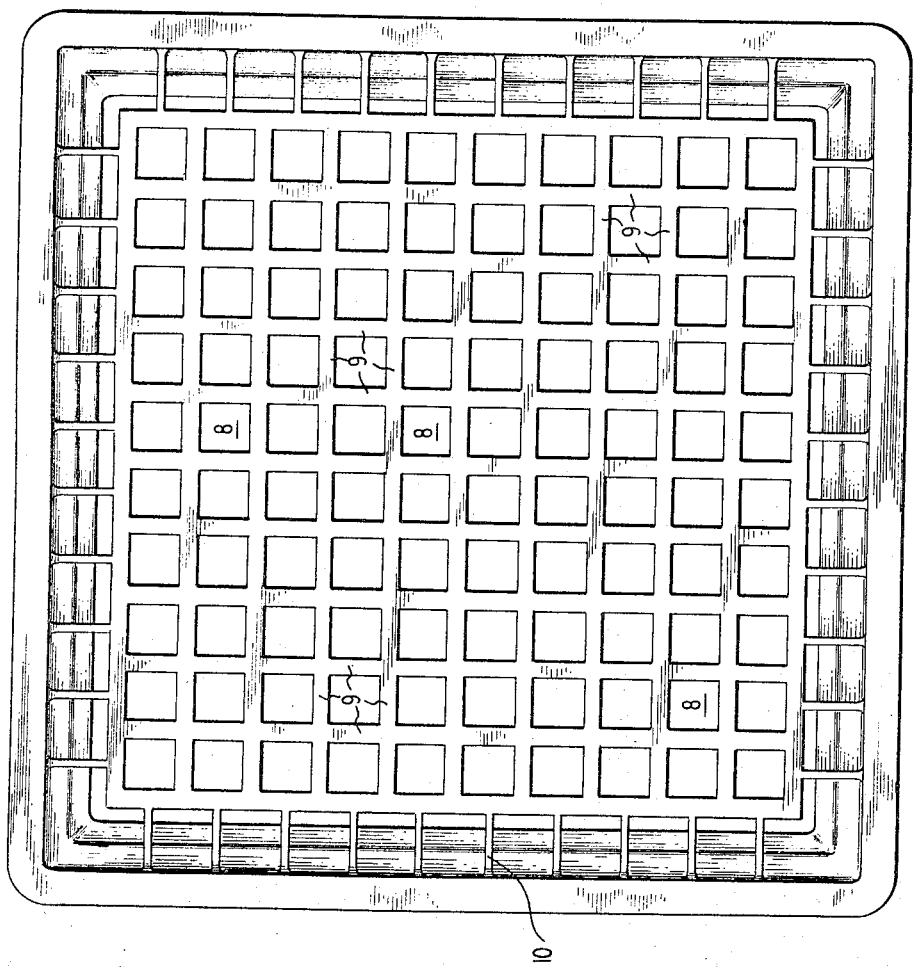
FIG. 2 is an enlarged top, plan view of the milk crate shown in FIG. 1.
Figure 1:
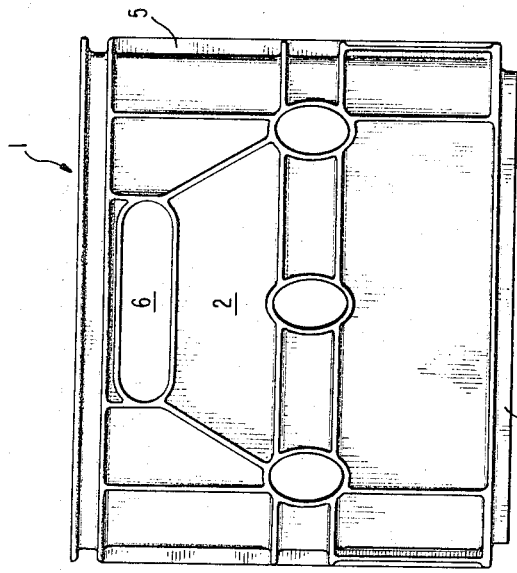
FIG. 1 is an elevation view of a milk crate formed according to this invention.

Referring now to the drawings in detail, a molded plastic milk crate according to the present invention is indicated generally by the numeral 1, and is shown having four integrally joined vertically extending side panels 2 and a bottom panel 3 molded in the form of an open grating. Side panels 2 may have a stacking ring 4 integrally molded around their bottom edge and reinforcing or stiffening ribs 5 may be provided as needed. Also, a handle opening 6 may be formed in the side panels in the conventional manner.

Referring particularly to FIG. 3, it is seen that the various segments of the milk crate 1 may vary considerably in their cross-sectional shape and dimensions. For example, the vertical side walls 2 are normally substantially flat and of relatively thin, uniform cross-section while the segment at the bottom edge of the panel 2, which includes a portion of the side panel integrally joined with the stacking ring 4 and a further reinforcing flange 5, is of relatively heavy cross-section. The bottom panel 3 may vary in section from a relatively heavy section for crates employed for handling heavy material to a relatively light section for crates employed to handle lightweight material. In the illustrated embodiment, the bottom panel 3 is of relatively light section but dimensioned for maximum support required for handling articles such as bottles of milk. Panel 3 is an open grating including a plurality of openings 8 defined by perpendicularly arranged, elongated web-like members 9 integrally joined at their respective ends. As best seen in FIG. 3, the web members 9 have their maximum dimension in the vertical plane to provide maximum strength to the bottom panel 3. Web members 9 have their minimum dimensions in the plane of bottom panel 3 and, since the crate is molded from a flexible plastic material, the web members 9 may be resiliently deflected, or bent, slightly within the plane of the bottom panel between their respective ends.

Bottom panel 3 is integrally joined to the side panels 2, adjacent the bottom thereof, by a plurality of relatively thin gusset members 10 having one end integrally molded to the bottom panel 2 (best seen in FIG. 3) and the other end integrally molded with bottom panel 3. In the embodiment illustrated in FIG. 2, gussets 10 are integrally joined to the web members 9 which form the peripheral edge of bottom panel 3 at a point midway between the ends of the respective web members 9. Since web members 9 are dimensioned for slight resiliently resisted deflection in the plane of the bottom panel 3, it is apparent that the structure illustrated in FIG. 2 will readily accommodate slight differential shrinkage between the side panels 2 and bottom panel 3 by flexing the web members 9 which are integrally joined to gussets 10.

In crates where substantial shrinkage differential between the bottom and side panels may be encountered, the structure illustrated in FIGS. 4–6 may be desirable. In the embodiment illustrated in FIG. 4, the web members 11 which form the peripheral edge of bottom panel 3 are of reduced dimension in the plane of the bottom panel to provide for greater flexibility. Also, gussets 12 are of a length greater than the distance between web members 11 and the adjacent bottom portion of side panels 2 and are formed into a substantially S-shape as viewed from the top of the crate. This S-shape of the gusset members 12 provides for substantially greater relative movement between bottom panel 3 and side panels 2 than the embodiment illustrated in FIG. 2.

In FIG. 5, gusset members 14 have one end integrally molded with the side panels 2 and their other end integrally molded with an intermediate web member 15. Intermediate web 15 is integrally joined, at points midway between successive gusset members 14 with secondary gusset members 16 which, in turn, are integrally molded with web members 17 which forms the outer periphery of bottom panel 3. Secondary gussets 16 are joined with web members 17 at the mid point of the respective web members 17 so that differential shrinkage between bottom panel 3 and side panel 2 may result in slight bending or deflection of web member 17 and intermediate webs 15.

In the embodiment illustrated in FIG. 6, relative movement between bottom panel 3 and side panels 2 is accommodated entirely by the resilience of gusset members 18. Gussets 18 are substantially longer than the distance between bottom panel 3 and side panel 2, and are formed to provide minimum resistance to relative movement between bottom panel 3 and sides 2 within the plane of the bottom panel.

From the above it is believed apparent that a milk crate having integrally molded side and bottom panels constructed according to this invention will not be adversely affected by differential shrinkage, or relative movement, between the side and bottom panels. Further, while I have disclosed preferred embodiments of my invention I wish it understood that I do not intend to be restricted solely thereto, but that I do intend to include all embodiments thereof which would be apparent to one skilled in the art and which come within the spirit and scope of my invention.

I claim:

1. A material handling container comprising a substantially rigid generally rectangular bottom panel molded from a synthetic resin material, side panels spaced outwardly from said bottom panel one adjacent each side edge thereof and extending upwardly therefrom, said side panels being joined along their side edges and having a segment of enlarged cross-section molded from synthetic resin material extending along the bottom portion thereof in outwardly spaced relation to said bottom panel, and means supporting said bottom panel for limited relative movement in the plane of said bottom panel with respect to said side panels, said means supporting said bottom panel including a plurality of gusset elements joining the peripheral edges of said bottom panel to said segment of enlarged cross-section, said gusset elements, said bottom panel, and said segment of enlarged cross-section being integrally molded from a single homogenous mass of synthetic resin material.

2. A material handling container molded from synthetic resin material comprising, a generally rectangular bottom panel, side panels spaced outwardly from each side edge of said bottom panel and extending upwardly therefrom, said side panels being integrally joined along their adjacent edges, a plurality of elongated gusset members extending between and integrally molded with said bottom panel and said bottom edges of said side panels, the length of said gusset members being greater than the distance between said bottom panel and said side panels, said gusset members being dimensioned for limited resiliently resisted movement in the plane of said bottom panel and relatively rigid in a direction normal to said bottom panel and being curved within the plane of said bottom panel to permit limited resiliently resisted deflection of said gusset members within the plane of said bottom panel to support said bottom panel for limited resiliently resisted movement relative to said side panels.

3. A material handling container molded from synthetic resin material comprising, a generally rectangular bottom panel, side panels spaced outwardly from each side edge of said bottom panel and extending upwardly therefrom said side panels being integrally joined at their adjacent edges, said bottom panel molded in the form of a grating including a plurality of openings defined by elongated web-like members integrally joined at their respective ends, said web-like members being dimensioned for limited resiliently resisted deflection intermediate their ends in the plane of said bottom panel, a plurality of elongated gusset members extending between and integrally molded with said bottom panel and said bottom edges of said side panels, said elongated gusset members each having one end integrally molded with said bottom edge of said side panel and the other end integrally joined with one of said web-like members of said bottom panel at a point intermediate the ends of said web-like members to support said bottom panel for limited resiliently resisted relative movement in the plane of said bottom panel and with respect to said side panels.

References Cited

UNITED STATES PATENTS 3,155,268   11/1964   Fogerty et al. _____ 220—21

FOREIGN PATENTS 952,979   3/1964   Great Britain.

THERON E. CONDON, *Primary Examiner.*

GEORGE E. LOWRANCE, *Examiner.*